US009684831B2

United States Patent
Krishnamoorthi et al.

(10) Patent No.: US 9,684,831 B2
(45) Date of Patent: Jun. 20, 2017

(54) ADAPTIVE EDGE-LIKE FEATURE SELECTION DURING OBJECT DETECTION

(71) Applicant: QUALCOMM Incorporated, San Diego, CA (US)

(72) Inventors: Raghuraman Krishnamoorthi, San Diego, CA (US); Bojan Vrcelj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/625,588

(22) Filed: Feb. 18, 2015

(65) Prior Publication Data

US 2016/0239708 A1 Aug. 18, 2016

(51) Int. Cl.
| | | |
|---|---|---|
| *G06K 9/00* | (2006.01) | |
| *G06K 9/46* | (2006.01) | |
| *G06F 17/30* | (2006.01) | |
| *G06K 9/62* | (2006.01) | |
| *G06T 7/13* | (2017.01) | |

(52) U.S. Cl.
CPC ... *G06K 9/00624* (2013.01); *G06F 17/30047* (2013.01); *G06F 17/30247* (2013.01); *G06K 9/4604* (2013.01); *G06K 9/4671* (2013.01); *G06K 9/6228* (2013.01); *G06T 7/13* (2017.01)

(58) Field of Classification Search
CPC .................................................. G06K 9/00624
See application file for complete search history.

(56) References Cited

U.S. PATENT DOCUMENTS

| | | |
|---|---|---|
| 8,170,281 B2 | 5/2012 | Shamaie |
| 8,358,855 B2 | 1/2013 | Hamza et al. |
| 2003/0016859 A1 | 1/2003 | Weisgerber et al. |
| 2004/0008890 A1 | 1/2004 | Clark et al. |
| 2005/0002570 A1 | 1/2005 | Clark et al. |
| 2010/0260426 A1 | 10/2010 | Huang et al. |
| 2010/0310158 A1* | 12/2010 | Fu ........................ G06K 9/6278 382/159 |
| 2011/0052046 A1 | 3/2011 | Melikian |
| 2011/0222774 A1 | 9/2011 | Hong et al. |

(Continued)

OTHER PUBLICATIONS

Anonymous: "Scale-invariant Feature Transform—Wikipedia," May 18, 2016 (May 18, 2016), XP055277131, Retrieved from the Internet: URL:https://en.wikipedia.org/wiki/Scale-in_variant_feature_transform [retrieved on Jun. 1, 2016].
Grauman K., et al., "Visual Object Recognition Synthesis Lectures on Computer Vision # 1," Jan. 27, 2011 (Jan. 27, 2011), XP055166201, Retrieved from the Internet: URL:http://cs.gmu.edu/kosecka/cs482/grauman-recognition-draft-27-01-11.pdf.

(Continued)

*Primary Examiner* — Oneal R Mistry
(74) *Attorney, Agent, or Firm* — Blakely, Sokoloff, Taylor & Zafman

(57) ABSTRACT

A method of recognizing an object of interest in an image includes extracting a first set of features from within the image. Each extracted feature in the first set of features is then categorized as either blob-like or edge-like. A second set of features is then taken from the first set, where a number of the edge-like features to include in the second set of features is based on a relative number of edge-like features to blob-like features included in the first set of extracted features. An object of interest within the image is detected according to the second set of features.

30 Claims, 10 Drawing Sheets

(56) References Cited

U.S. PATENT DOCUMENTS

| | | | |
|---|---|---|---|
| 2011/0249867 A1* | 10/2011 | Haas | G06K 9/00818 382/103 |
| 2011/0293140 A1* | 12/2011 | Wagner | G06T 7/204 382/103 |
| 2013/0194428 A1* | 8/2013 | Chao | G01C 21/20 348/159 |
| 2013/0223763 A1* | 8/2013 | Lin | G06K 9/6204 382/294 |
| 2013/0287252 A1* | 10/2013 | Bruun | G06T 7/0012 382/103 |
| 2013/0308860 A1* | 11/2013 | Mainali | G06K 9/4671 382/170 |

OTHER PUBLICATIONS

Guang-Hui W., et al., "An Algorithm of Parameters Adaptive Scale-invariant Feature for High Precision Matching of Multi-source Remote Sensing Image," Urban Remote Sensing Event, 2009 Joint, IEEE, Piscataway, NJ, USA, May 20, 2009 (May 20, 2009), pp. 1-7, XP031481413, ISBN: 978-1-4244-3460-2.
International Search Report and Written Opinion—PCT/US2016/018097—ISA/EPO—Jun. 9, 2016.
Tuytelaars et al., "Local Invariant Feature Detectors: A Survey," Foundations and Trends in Computer Graphics and Vision, Now Publishers Inc, US, vol. 3, No. 3, Jan. 1, 2008 (Jan. 1, 2008), pp. 177-280, XP002616097, ISSN: 1572-2740, DOI: 10.1561/0600000017.

* cited by examiner

ADAPTIVE EDGE-LIKE FEATURE SELECTION DURING OBJECT DETECTION

TECHNICAL FIELD

This disclosure relates generally to computer vision based object recognition applications, and in particular but not exclusively, relates to selecting extracted features to compare against a feature database for object detection.

BACKGROUND INFORMATION

A challenge to enabling Augmented Reality (AR) on mobile phones or other mobile platforms is the problem of detecting and tracking objects in real-time. Object detection for AR applications has very demanding requirements: it must deliver full six degrees of freedom, give absolute measurements with respect to a given coordinate system, be very robust and run in real-time. Of interest are methods to compute camera position and orientation (pose) using computer vision (CV) based approaches, which rely on first detecting and, subsequently, tracking objects within the camera view. In one aspect, the detection operation includes detecting a set of features contained within the digital image in order for those features to be compared against a database of known features corresponding to real-world objects. A feature may refer to a region in the digital image that differs in properties, such as brightness or color, compared to areas surrounding that region. In one aspect, a feature is a region of a digital image in which some properties are constant or vary within a prescribed range of values.

A feature may be regarded as either blob-like or edge-like, based, in part, on its shape. Blob-like features may be highly localized on an object, thus making the correlating of features easier, whereas edge-like features are not necessarily localized. Some types of feature detection algorithms attempt to filter out features that are deemed too edge-like so as to reduce processing times. For example, the Scale-invariant feature transform (SIFT) algorithm calculates eigenvalues of the Hessian of each feature. Then the ratio of the eigenvalues of each feature is compared against a fixed threshold. If the ratio is higher than the fixed threshold then the feature is deemed too edge-like and the feature is discarded.

However, problems arise when trying to use the same detector to detect both objects that are feature-rich and objects that are not. Objects that are not feature-rich, such as logos, include mostly edge-like features and very few, if any, blob-like features. This is because most logos are man-made and on purpose avoid sharp corners and non-smooth blobs. If the feature detector is "relaxed" to allow in more edge-like features, then a subsequent feature-rich target object may result in more features than processing may reasonably allow. That is, the limited computational capabilities of the mobile phone CPU makes it difficult, if not impossible to detect an object in an image that includes too many features.

BRIEF SUMMARY

Embodiments disclosed herein may relate to a method to recognize an object of interest in an image. The method may include extracting a first set of features from within the image and determining whether each feature included in the first set of features is a blob-like feature or an edge-like feature. The method may also include determining a second set of features taken from the first set, where a number of the edge-like features included in the second set of features is based on a relative number of edge-like features to blob-like features included in the first set of features. The method may further include determining whether the object of interest is present within the image according to the second set of features.

Embodiments disclosed herein may relate to a device for recognizing an object of interest in an image. The device may include instructions for extracting a first set of features from within the image and determining whether each feature included in the first set of features is a blob-like feature or an edge-like feature. The device may also include instructions for determining a second set of features taken from the first set, where a number of the edge-like features included in the second set of features is based on a relative number of edge-like features to blob-like features included in the first set of features. The device may further include instructions for determining whether the object of interest is present within the image according to the second set of features.

Embodiments disclosed herein may relate to a computer-readable medium including program code stored thereon for recognizing an object of interest in an image. The medium may include code for extracting a first set of features from within the image and code for determining whether each feature included in the first set of features is a blob-like feature or an edge-like feature. The medium may also include code for determining a second set of features taken from the first set, where a number of the edge-like features included in the second set of features is based on a relative number of edge-like features to blob-like features included in the first set of features. The medium may further include code for determining whether the object of interest is present within the image according to the second set of features.

Embodiments disclosed herein may relate to an apparatus for recognizing an object of interest in an image. The apparatus may include means for extracting a first set of features from within the image and means for determining whether each feature included in the first set of features is a blob-like feature or an edge-like feature. The apparatus may also include means for determining a second set of features taken from the first set, where a number of the edge-like features included in the second set of features is based on a relative number of edge-like features to blob-like features included in the first set of features. The apparatus may further include means for determining whether the object of interest is present within the image according to the second set of features.

The above and other aspects, objects, and features of the present disclosure will become apparent from the following description of various embodiments, given in conjunction with the accompanying drawings.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Reference throughout this specification to "one embodiment", "an embodiment", "one example", or "an example" means that a particular feature, structure, or characteristic described in connection with the embodiment or example is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Any example or embodiment described herein is not to be construed as preferred or advantageous over other examples or embodiments.

Figure 1:
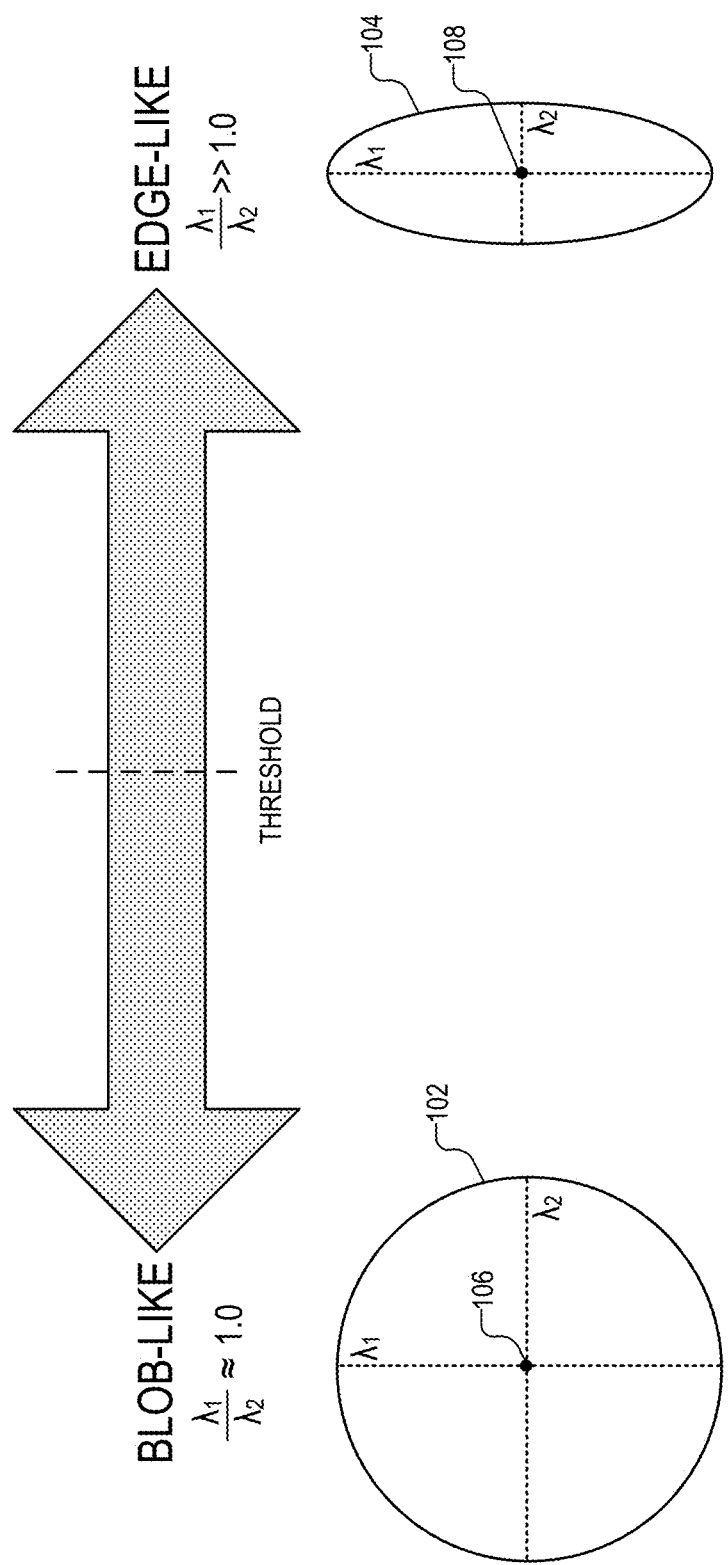
FIG. 1 is a diagram illustrating a blob-like feature and an edge-like feature, in one embodiment.

In one embodiment, a mobile platform or device, detects a target object in real-time, by first capturing or receiving a digital image of the object. For example, a camera integrated into the mobile platform may capture the digital image, or the image may be captured by a separate platform and sent to the mobile platform for processing as described herein. A first set of features are then extracted from within the digital image. In one example, feature extraction includes applying a Laplacian of Gaussian (LoG) or a Difference of Gaussians (DoG) based feature detector such as a Scale-invariant feature transform (SIFT) algorithm. In other embodiments, features may be determined according to features from accelerated segment test (FAST), efficient dense descriptor (DAISY), or other algorithm. A feature may include a point of interest or "keypoint" and a description of the region surrounding the interest point. The description may be used to determine a feature's "blobness"; that is, whether the feature is more blob-like or edge-like. FIG. 1 illustrates two example features; a blob-like feature 102 and an edge-like feature 104. As shown in FIG. 1, a blob-like feature may be regarded as one that is more circular, while an edge-like feature is more elliptical. In one example, the eigenvalues of the Hessian matrix are computed for each feature. The ratio of the maximum eigenvalue to the minimum eigenvalue may be used as a measure of the feature's blobness. For example, an eignevalue ratio (E_RATIO) may be computed according to equation 1, as follows:

$$E\_RATIO = \frac{\lambda_1}{\lambda_2} \qquad EQ. 1$$

Thus, as shown in FIG. 1, feature 102 includes eigenvalue $\lambda_1$ and eigenvalue $\lambda_2$, where the eigenvalue ratio is approximately equal to one (1.0). The closer the eigenvalue ratio is to 1.0, the more blob-like the feature. Conversely, the more that the eigenvalue ratio is greater than one, the more edge-like the feature. For example, feature 104 has an eigenvalue ratio that is much greater than 1.0 and is thus considered an edge-like feature.

Accordingly, embodiments of the present invention include determining whether each extracted feature is a blob-like feature or an edge-like feature. In one embodiment, the eigenvalue ratio may be compared to a threshold. In one embodiment, the threshold may be a fixed threshold greater than 1.0. In other embodiments, the threshold may be a dynamic threshold based on the image, set of images, or other data. For example, a multiple pass system may calculate eigenvalues are calculated for all features. A separation between the eigenvalues for the edge like features and the blob like features may be detected and the threshold may be determined according to the area of separation. In a different example of dynamic updating of the threshold, the value that provides a clear separation may be used as a weighted value with previously used thresholds. Features whose eigenvalue ratio is less than the threshold are determined to be blob-like, while features whose eigenvalue ratio is greater than the threshold are determined to be edge-like.

Once the features are categorized as either edge-like or blob-like, an edge-to-blob ratio is computed. That is, a ratio (r) of the number of edge-like features $N_{edge}$ to the number of blob-like features $N_{blob}$ is computed as:

$$r = \frac{N_{edge}}{E_{blob}} \qquad EQ. 2$$

The edge-to-blob ratio (r) is then used to determine the number of the edge-like features to keep for further processing. In one example, the greater the relative number of edge-like features, the greater the percentage of the extracted edge-like features that are kept. Similarly, the lesser the relative number of edge-like features, the lesser the percentage of the extracted edge-like features that are kept.

Figure 2A:
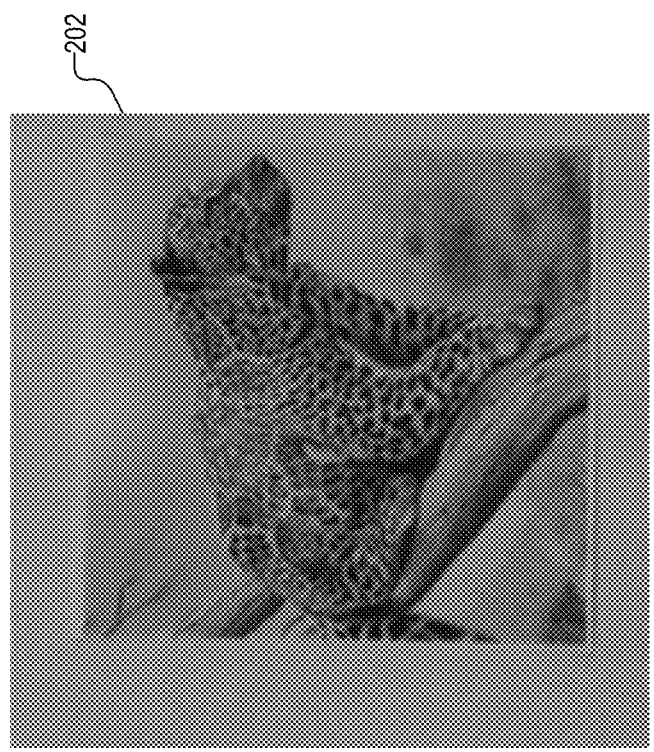
FIG. 2A is an example feature-rich image that includes numerous blob-like and numerous edge-like features.

This process allows for a variable number of edge-like features to be used in the detection of an object based on the richness of the image. For example, FIG. 2A illustrates a feature-rich image 202 that contains numerous blob-like and numerous edge-like features. Image 202 of FIG. 2A contains enough blob-like features that little to no edge-like features are needed in order to effectively and efficiently detect the target object (i.e., the leopard). The computed edge-to-blob ratio r of an image, such as image 202, may be close to, if not less than 1.0. Thus, a large number if not all of the extracted edge-like features may be discarded and not used for further object detection.

Figure 2B:
FIG. 2B is an example non-feature-rich image that includes few, if any, blob-like features.

In contrast, FIG. 2B illustrates a non-feature-rich image 203 that contains very few, if any blob-like features. However, image 203 does contain numerous edge-like features. Therefore, the edge-to-blob ratio may be very high (e.g., 4.0 or greater). In this case, a large percentage of the extracted edge-like features are retained for use in the detection of the target object (i.e., handicapped logo).

Figure 3:
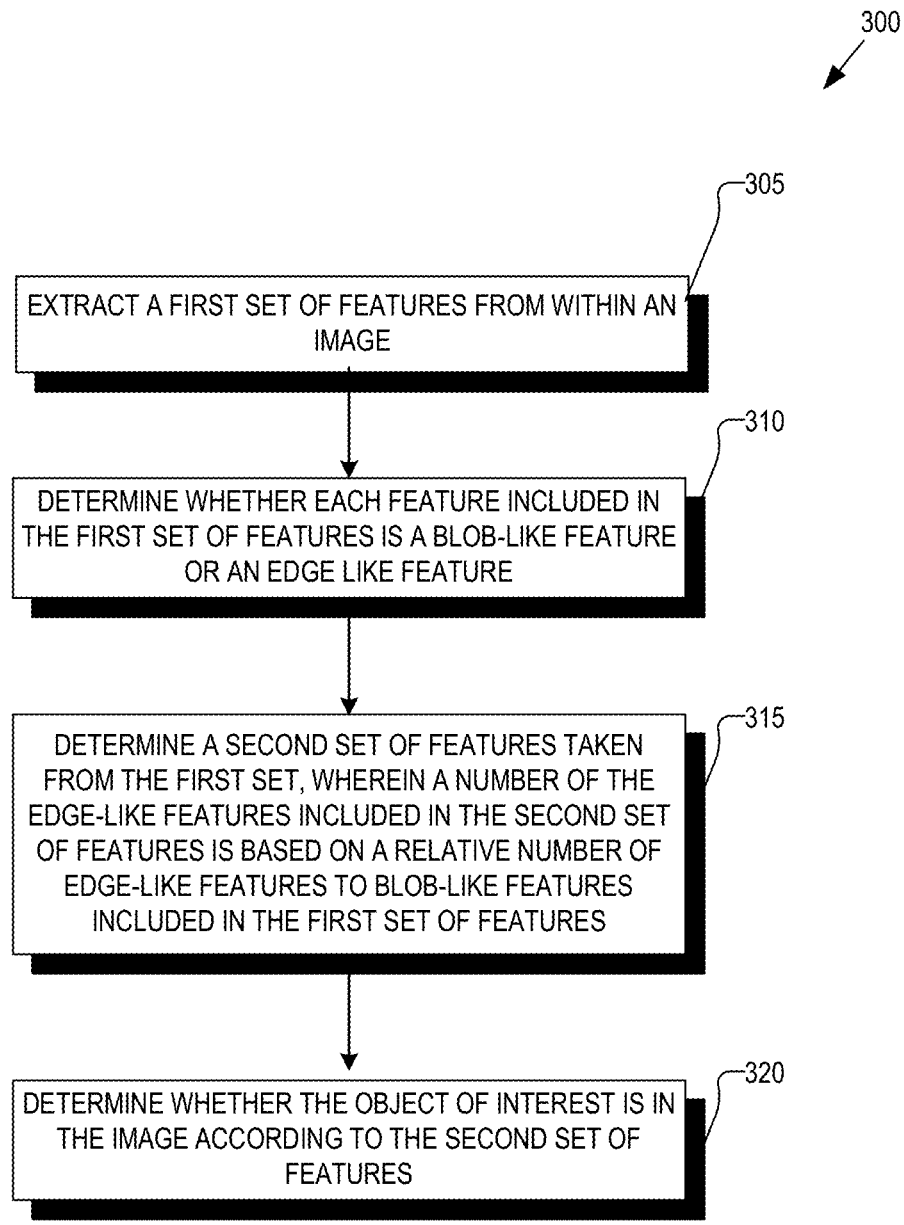
FIG. 3 is a flowchart illustrating a process of recognizing an object of interest in an image, in one embodiment.

FIG. 3 is a flowchart illustrating a process 300 of recognizing an object of interest in an image, in one embodiment. Process 300 begins at process block 305, to extract a first set of features from within the image. For example, feature extraction includes applying a LoG or a DoG based feature detector to the image in order to extract the first set of features. As introduced above, in some embodiments the feature detector may be determined with a SIFT, FAST, DAISY, or other feature detection algorithm.

Process 300 at block 310 then determines whether each feature included in the first set of features is a blob-like feature or an edge-like feature. Determining whether a feature is a blob-like feature or an edge-like feature may include: computing a first eigenvalue and a second eigenvalue of the feature, computing a ratio of the first eigenvalue to the second eigenvalue, and comparing the ratio to a threshold.

Process 300 at block 315 then determines a second set of features taken from the first set, where a number of the edge-like features included in the second set of features is based on a relative number of edge-like features to blob-like features included in the first set of features. The number of the edge-like features included in the second set of features may be a function of a ratio of the number of edge-like features to the number of blob-like features included in the first set of features. In some embodiments, the function is a piecewise function such that the number of the edge-like features included in the second set of features is zero when the ratio is less than a lower threshold and all the edge-like features of the first set are included in the second set when the ratio is greater than an upper threshold. The number of edge-like features included in the second set of features may increase linearly when the ratio is between the lower and upper threshold. For example, increasing linearly as the ratio increases in value within the range of the lower and upper threshold. Further details related to the determining the second set of features is described in greater detail below with regards to FIG. 4.

Process 300 at block 320 then determines whether the object of interest is present within the image according to the second set of features. Determining whether the object of interest is present may include querying a feature database using the second set of features. In some embodiments, process 300 segments the image into a plurality of regions and selects the features from the first set that are to be included in the second set of features such that the second set of features are distributed among the plurality of regions. In some embodiments, the image is captured with a camera and process 300 updates a pose of the camera in response to determining that the object of interest is in the image.

Figure 4:
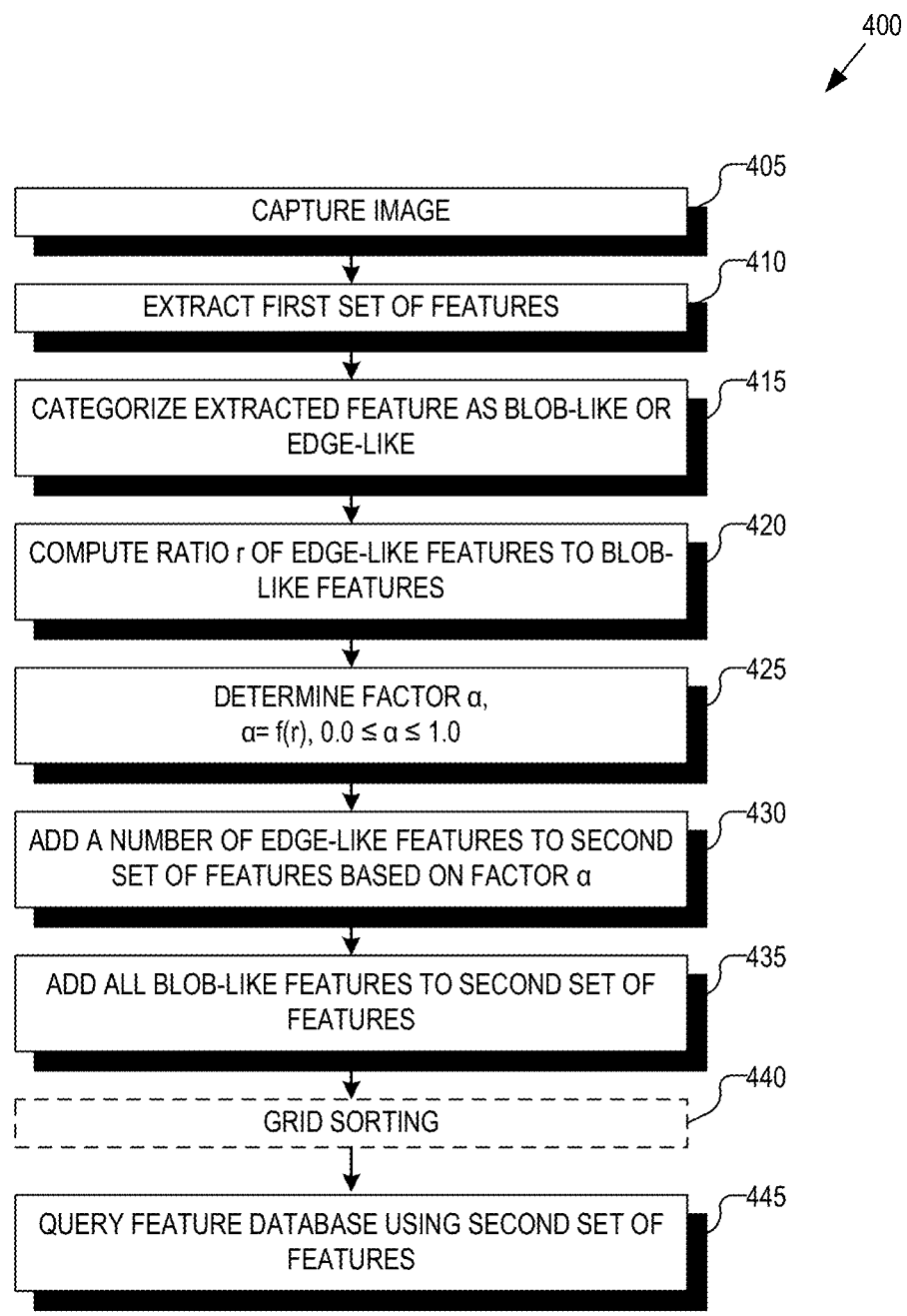
FIG. 4 is a flowchart illustrating a process of recognizing an object of interest in an image, in another embodiment.

FIG. 4 is a flowchart illustrating a process 400 of recognizing an object of interest in an image, in another embodiment. Process 400 begins at process block 405, which includes capturing, or otherwise acquiring a digital image that may, or may not contain an object of interest. In one embodiment, the digital image is captured by the platform or device performing process 400. In other embodiments, the digital image is created by an external platform or device and sent to or received by the platform performing process 400. For example, process 400 may be performed by a platform or device that provides for processing and display of images received from a separately implemented camera. Process block 410 then includes extracting a first set of features from the image. As mentioned above, the first set of features may be extracted by utilizing SIFT, FAST, DAISY, or other algorithm. Next, in process block 415 the extracted features of the first set are categorized as either blob-like or edge-like.

Figure 5:
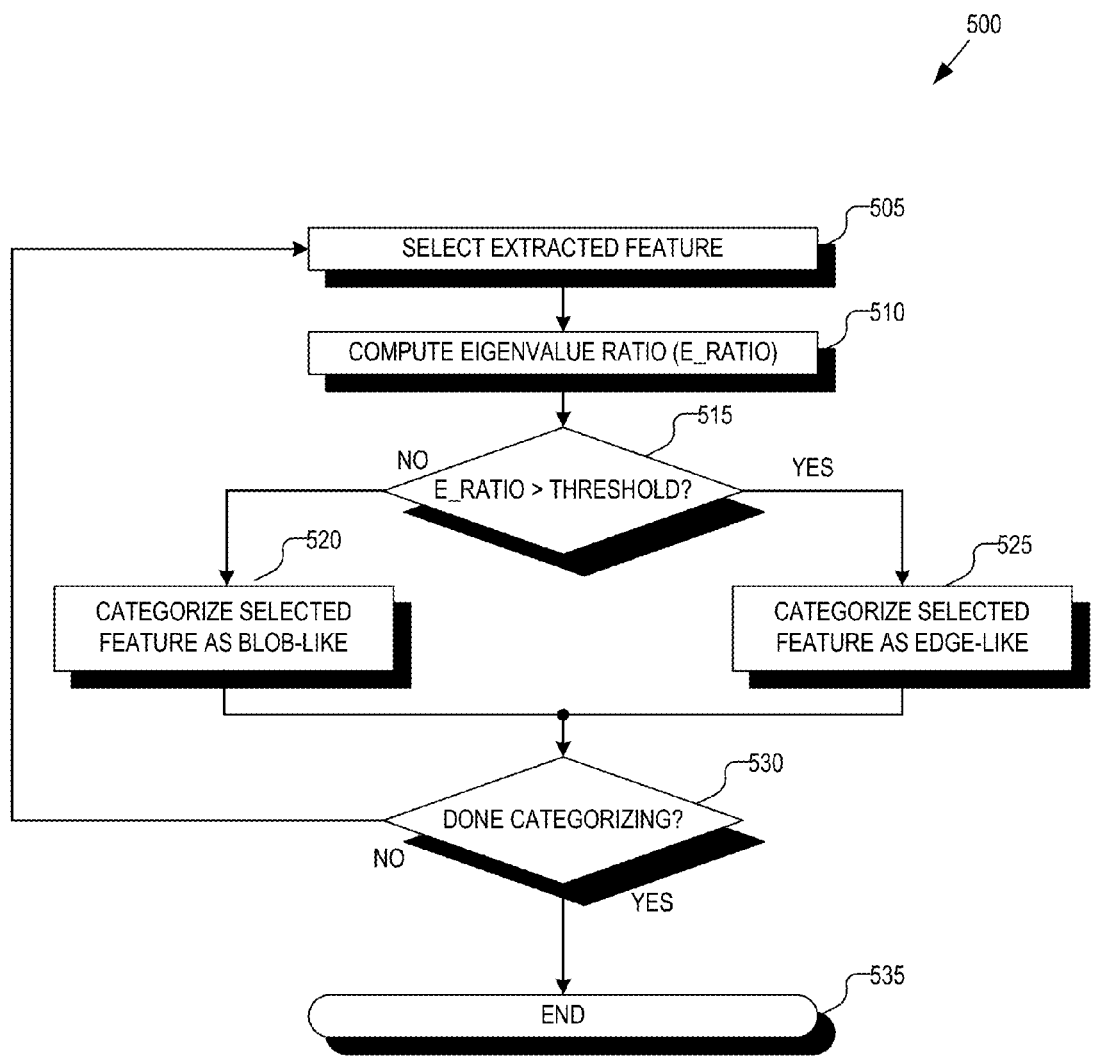
FIG. 5 is flowchart illustrating a process of categorizing extracted features as either blob-like or edge-like, in one embodiment.

FIG. 5 is flowchart illustrating an example process 500 of categorizing extracted features as either blob-like or edge-like. Process 500 is one possible implementation of process block 415 of FIG. 4. In process block 505 one of the extracted features of the first set is selected. Next, in process block 510 the eigenvalue ratio (E_RATIO) is computed for the selected feature. As mentioned above, computing the eigenvalue ratio may first include computing the eigenvalues of the Hessian matrix for the selected feature and then computing the eigenvalue ratio with equation 1. Decision block 515 then compares the computed eigenvalue ratio with a threshold. In one embodiment, the ratio is fixed and is greater than 1.0. If the computed eigenvalue ratio is less than the threshold then process block 520 categorizes the selected feature as blob-like. If, however, the computed eigenvalue ratio is greater than the threshold then process block 525 categorizes the selected feature as edge-like.

Once the selected feature is categorized, process 500 proceeds to decision block 530, which determines whether the categorizing is complete. In one embodiment, the categorizing is complete if each of the extracted features of the first set have been categorized. If so, process 500 completes at block 535. However, if in decision block 530 it is determined that there remains extracted features to categorize, process 500 returns to process block 505 where a next extracted feature is selected for categorization.

Alternatively, or in addition to process 500, a process for categorizing the extracted features may include computing the eigenvalue ratio for each extracted feature and then sorting the features in order (e.g., a list) based on their calculated eigenvalue ratio. Accordingly, the blob-like features may be all those features in the sorted list whose eigenvalue ratio is below the threshold, while the edge-like features are those features whose eigenvalue ratio is above the threshold.

Returning now to process 400 of FIG. 4, once process block 415 categorizes the features as either edge-like or blob-like, process block 420 then computes an edge-to-blob ratio. That is, a ratio (r) of the number of edge-like features $N_{edge}$ to the number of blob-like features $N_{blob}$ is computed. In one embodiment, the edge-to-blob ratio r is computed based on equation 2, above. Process block 425 then includes determining a factor α based on the edge-to-blob ratio r. The factor α is representative of a percentage of the extracted edge-like features that are to be kept for further processing in the attempted detection of a target object.

Figure 6:
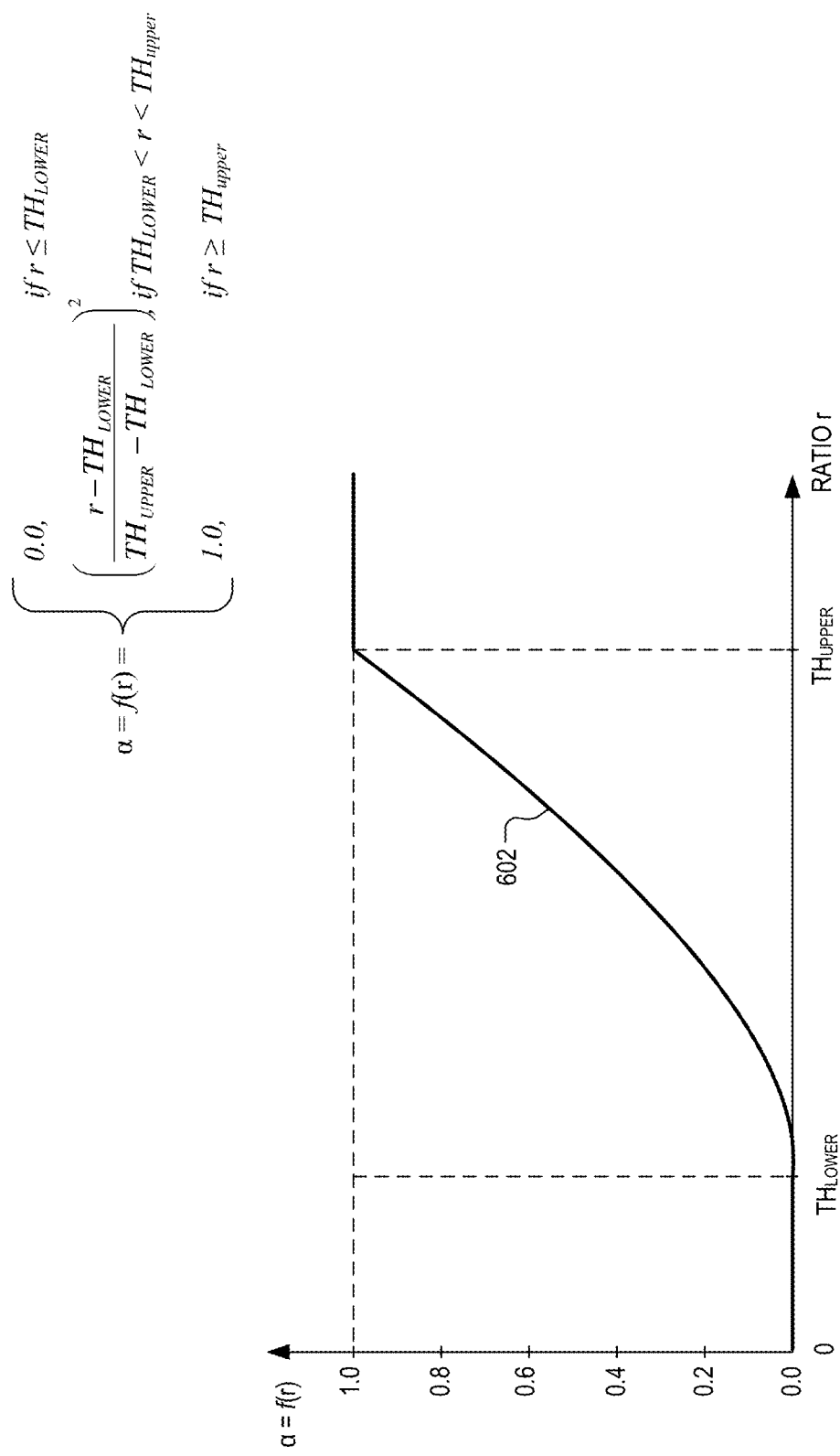
FIG. 6 is a diagram illustrating an example function $f( )$ applied to the edge-to-blob ratio r in order to calculate a factor α, in one embodiment.

FIG. 6 illustrates an example function $f(\,)$ applied to the edge-to-blob ratio r in order to calculate the factor α. As shown in FIG. 6, function $f(r)$ may be a piecewise function. That is, α may be calculated as follows:

$$\alpha = f(r) = \begin{cases} 0.0, & \text{if } r \leq TH_{LOWER} \\ \left(\frac{r - TH_{LOWER}}{TH_{UPPER} - TH_{LOWER}}\right)^2, & \text{if } TH_{LOWER} < r < TH_{UPPER} \\ 1.0, & \text{if } r \geq TH_{UPPER} \end{cases} \quad \text{EQ. 3}$$

where $TH_{LOWER}$ is a lower threshold, and $TH_{UPPER}$ is an upper threshold. In one embodiment, $TH_{LOWER}$ is approximately equal to 1.0 and $TH_{UPPER}$ is approximately equal to 4.0.

Thus, as shown in FIG. 6, if the edge-to-blob ratio r is smaller than a lower threshold $TH_{LOWER}$ (i.e., the image is feature-rich with large number of blob-like features) then α is zero (i.e., 0.0%) and none of the extracted edge-like features are used in subsequent object detection. Conversely, if the edge-to-blob ratio r is larger than the upper threshold $TH_{UPPER}$ then α is 1.0 (i.e., 100%) and all of the extracted edge-like features are retained. In between thresholds, α increases with increases in the ratio r. FIG. 6 illustrates α increasing according to a curve when the ratio r is between thresholds. In one embodiment, α increases quadratically as the ratio r increases towards the upper threshold $TH_{UPPER}$. In another embodiment, α increases linearly when the ratio r is between thresholds (i.e., α is proportional to r).

Returning again to process 400 of FIG. 4, once the factor α is determined, as described above, then process block 430 take a number of edge-like features from the first set and adds them to a second set of features. The number of edge-like features to add to the second set of features is determined by the computed factor α and may be calculated as the factor α multiplied by the number of extracted edge-like features (i.e., $\alpha \cdot N_{edge}$).

Next, process block 435 includes adding a number of the blob-like features to the second set of features. In one embodiment, all of the extracted blob-like features are added. Thus, the total number of features $N_{TOT}$ to be taken from the extracted first set and to include in a second set of features may be expressed as:

$$N_{TOT}=N_{blob}+\alpha \cdot N_{edge} \qquad \text{EQ.4}$$

In one embodiment, the edge-like features with the lowest eigenvalue ratios are the edge-like features that are added to the second set of features. Thus, extracted edge like features in excess of $\alpha \cdot N_{edge}$ that have higher eigenvalue ratios (i.e., the most edge-like features) may be discarded and not further used.

Figure 7:
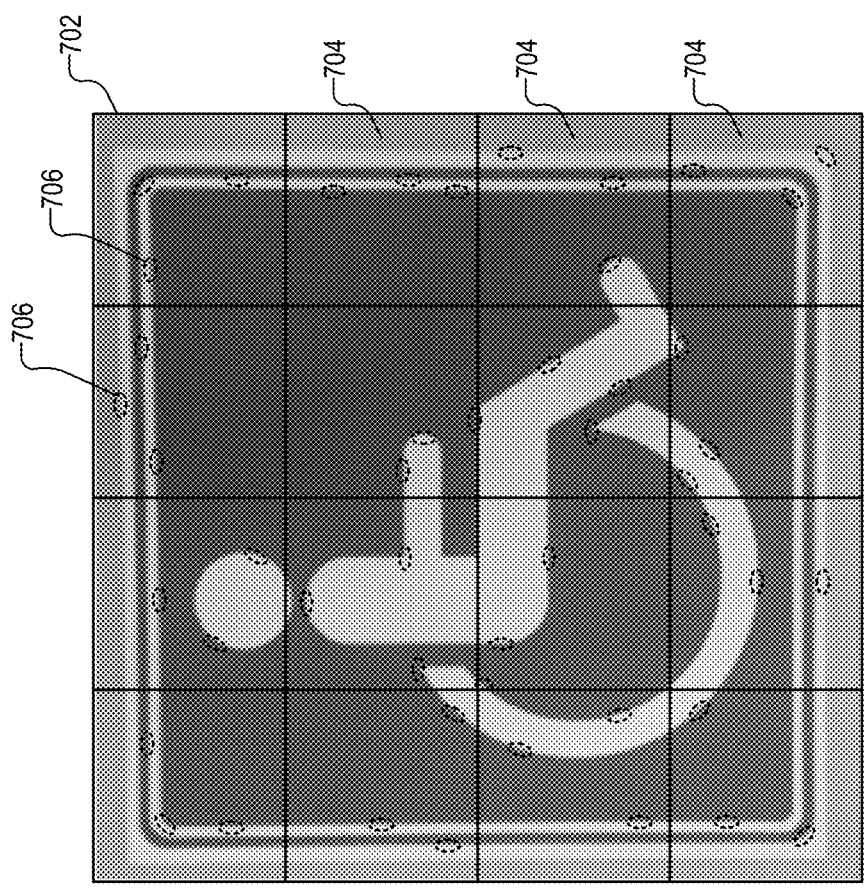
FIG. 7 is a diagram illustrating grid sorting of an image, in one embodiment.

Next, process 400 includes an optional process block 440 of grid sorting. In one embodiment, the maximum number of features to use is defined according to a configurable $N_{MAX}$ value. For example, some feature-based detection systems determine an allocated feature budget (i.e., $N_{MAX}$ value), based on one or more of the available processing time, and the desired response time of the system. Thus, as shown in FIG. 7, an image 702 may be segmented into several regions 704 where the selected features included in the second set of features are selected such that the features 706 are distributed among the several regions up until the maximum number $N_{MAX}$ of features is reached. Although FIG. 7 illustrates image 702 segmented into sixteen (16) regions, image 702 may be segmented into any number of regions including 2 or more, in accordance with embodiments of the present disclosure.

Next, in process block 445 of process 400, a feature database is queried using the second set of features. Features stored in the database are built pre-runtime by taking sample image(s) of known target objects. If, at least, some of the extracted features of the second set match with features stored in the database, then it is determined that the object of interest has been detected in the image. In one embodiment, the camera pose may then be updated.

Figure 8:
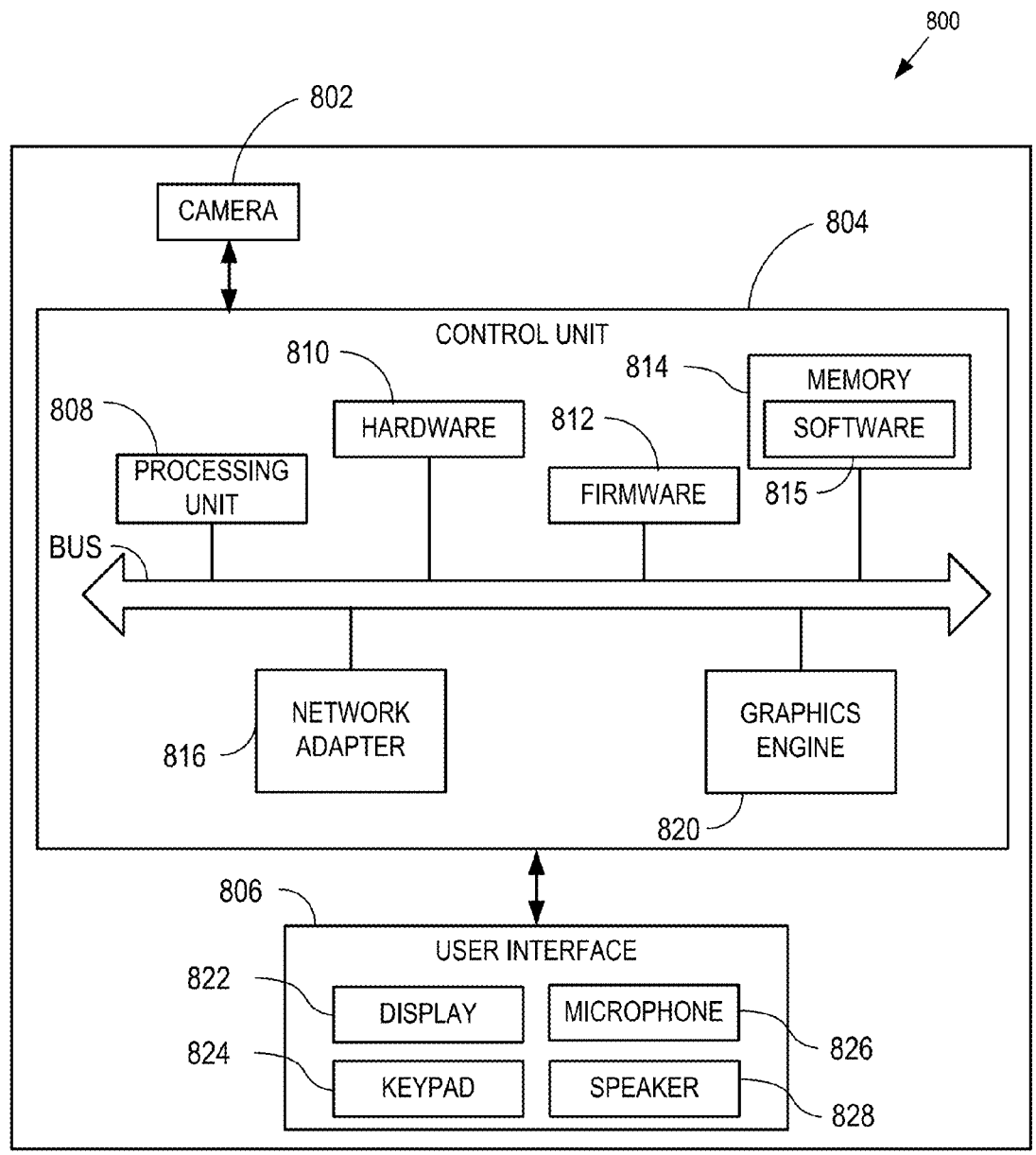
FIG. 8 is a functional block diagram of an exemplary mobile platform capable of performing the processes discussed herein.

FIG. 8 is a functional block diagram of a mobile platform 800 capable of performing the processes discussed herein. In one embodiment mobile platform 800 is a computer capable of object recognition using processes described herein, such as process 300 of FIG. 3, 400 of FIG. 4, and 500 of FIG. 5. Mobile platform 800 may optionally include a camera 802 as well as an optional user interface 806 that includes display 822. Display 822 is capable of displaying images captured by the camera 802 or images received from other sources. User interface 806 may also include a keypad 824 or other input device through which the user can input information into the mobile platform 800. If desired, the keypad 824 may be obviated by integrating a virtual keypad into the display 822 with a touch sensor. User interface 806 may also include a microphone 826 and speaker 828.

Mobile platform 800 also includes a control unit 804 that is connected to and communicates with camera 802 and user interface 806, if present. The control unit 804 accepts and processes images received from the camera 802 and/or from network adapter 816. Control unit 804 may be provided by a processing unit 808 and associated memory 814, hardware 810, software 815, and firmware 812.

Control unit 804 may further include a graphics engine 820, which may be, e.g., a gaming engine, to render desired data in the display 822, if desired. Processing unit 808 and graphics engine 820 are illustrated separately for clarity, but may be a single unit and/or implemented in processing unit 808 based on instructions in the software 815 which is run in processing unit 808. Processing unit 808, as well as the graphics engine 820 can, but need not necessarily include, one or more microprocessors, embedded processors, controllers, application specific integrated circuits (ASICs), digital signal processors (DSPs), and the like. The terms processor and processing unit describes the functions implemented by the system rather than specific hardware. Moreover, as used herein the term "memory" refers to any type of computer storage medium, including long term, short term, or other memory associated with mobile platform 800, and is not to be limited to any particular type of memory or number of memories, or type of media upon which memory is stored.

The processes described herein, including processes 300, 400, and 500, may be implemented by various means depending upon the application. For example, these processes may be implemented in hardware 810, firmware 812, software 815, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any computer-readable medium tangibly embodying instructions may be used in implementing the processes described herein. For example, program code may be stored in memory 814 and executed by the processing unit 808. Memory may be implemented within or external to the processing unit 808.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 9:
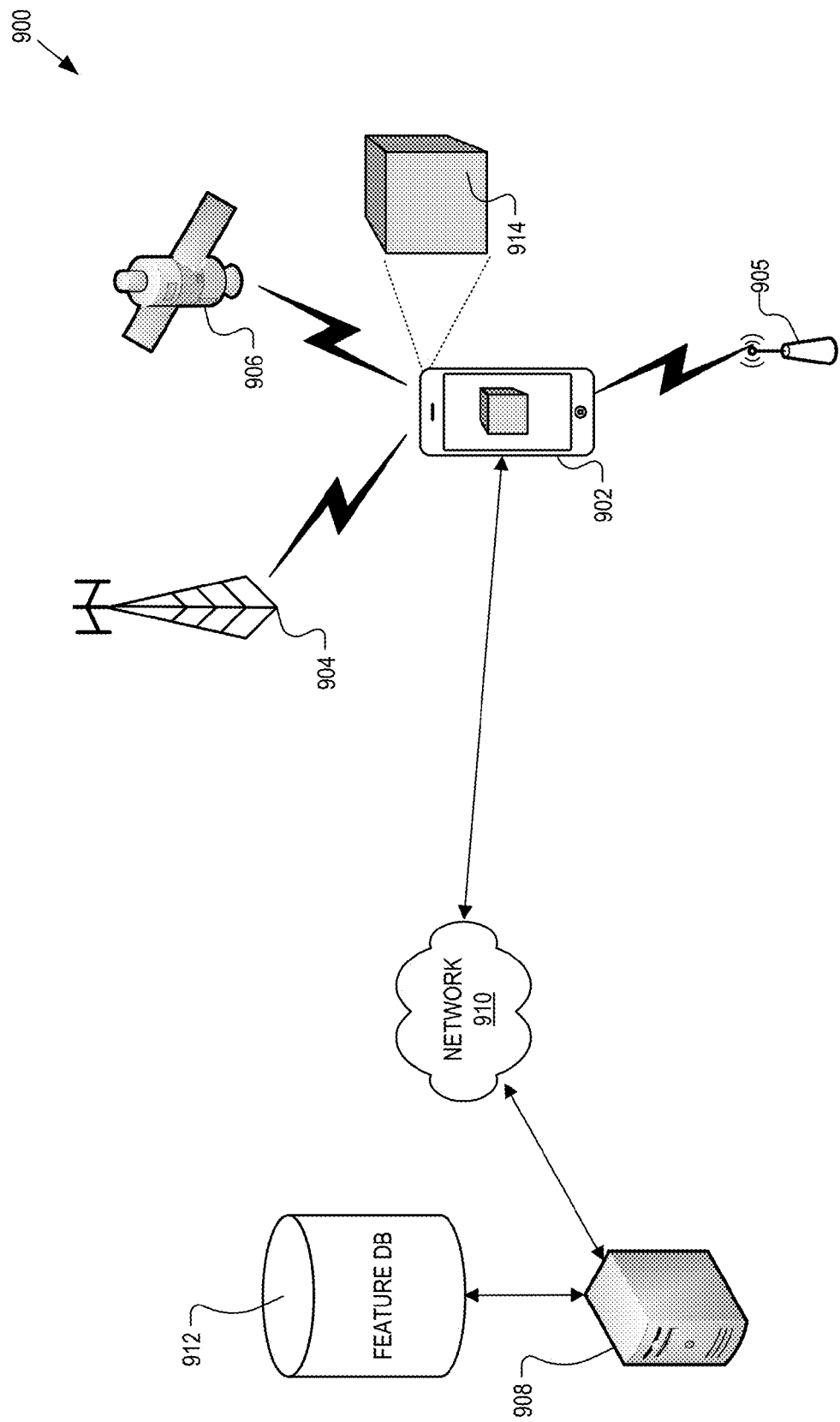
FIG. 9 is a functional block diagram of an exemplary object recognition system.

FIG. 9 is a functional block diagram of an object recognition system 900. As shown, object recognition system 900 includes an example mobile platform 902 that includes a camera (not shown in current view) capable of capturing images of an object 914 that is to be identified by comparison to a feature database 912.

The mobile platform 902 may include a display to show images captured by the camera or received from another source. The mobile platform 902 may also be used for navigation based on, e.g., determining its latitude and longitude using signals from a satellite positioning system (SPS), which includes satellite vehicle(s) 906, or any other appropriate source for determining position including cellular tower(s) 904 or wireless communication access points 905. The mobile platform 902 may also include orientation sensors, such as a digital compass, accelerometers or gyroscopes, that can be used to determine the orientation of the mobile platform 902.

As used herein, a mobile platform refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. In addition a "mobile platform" may also include all electronic devices which are capable of augmented reality (AR), virtual reality (VR), and/or mixed reality (MR) applications. Any operable combination of the above are also considered a "mobile platform."

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 906. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile platform 902 is not limited to use with an SPS for position determination, as position determination techniques may be implemented in conjunction with various wireless communication networks, including cellular towers 904 and from wireless communication access points 905, such as a wireless wide area network (WWAN), a wireless local area network (WLAN), a wireless personal area network (WPAN). Further the mobile platform 902 may access one or more servers 908 to obtain data, such as reference images and reference features from a database 912, using various wireless communication networks via cellular towers 904 and from wireless communication access points 905, or using satellite vehicles 906 if desired. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

As shown in FIG. 9, system 900 includes mobile platform 902 capturing an image of object 914 to be identified by comparison to a feature database 912. As illustrated, the mobile platform 902 may access a network 910, such as a wireless wide area network (WWAN), e.g., via cellular tower 904 or wireless communication access point 905, which is coupled to a server 908, which is connected to database 912 that stores information related to target objects and their images. While FIG. 9 shows one server 908, it should be understood that multiple servers may be used, as well as multiple databases 912. Mobile platform 902 may perform the object detection itself, as illustrated in FIG. 9, by obtaining at least a portion of database 912 from server 908 and storing the downloaded data in a local database inside the mobile platform 902. In some embodiments, mobile platform 902 maintains a local feature database instead of, or in addition to database 912 from server 908. The portion of a database obtained from server 908 may be based on the mobile platform's geographic location as determined by the mobile platform's positioning system. Moreover, the portion of the database obtained from server 908 may depend upon the particular application that requires the database on the mobile platform 902. The mobile platform 902 may extract features from a captured query image, as described above in process 400, and match the features of the second set to features that are stored in the local database. The query image may be an image in the preview frame from the camera or an image captured by the camera, or a frame extracted from a video sequence. The object detection may be based, at least in part, on determined confidence levels for each query feature, which can then be used in outlier removal. By downloading a small portion of the database 912 based on the mobile platform's geographic location and performing the object detection on the mobile platform 902, network latency issues may be avoided and the over the air (OTA) bandwidth usage is reduced along with memory requirements on the client (i.e., mobile platform) side. If desired, however, the object detection may be performed by the server 908 (or other server), where either the query image itself or the extracted features from the query image are provided to the server 908 by the mobile platform 902.

The order in which some or all of the process blocks appear in each process discussed above should not be deemed limiting. Rather, one of ordinary skill in the art having the benefit of the present disclosure will understand that some of the process blocks may be executed in a variety of orders not illustrated.

Those of skill would further appreciate that the various illustrative logical blocks, modules, engines, circuits, and algorithm steps described in connection with the embodiments disclosed herein may be implemented as electronic hardware or apparatus, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Various modifications to the embodiments disclosed herein will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method of recognizing an object of interest in an image, the method comprising:
   extracting a first set of features from within the image;
   determining whether each feature included in the first set of features is a blob-like feature or an edge-like feature;
   determining a second set of features taken from the first set of features, wherein a number of the edge-like features included in the second set of features is based on a ratio of edge-like features to blob-like features included in the first set of features; and
   determining whether the object of interest is in the image according to the second set of features.

2. The computer-implemented method of claim 1, wherein determining whether the object of interest is in the image comprises querying a feature database using the second set of features.

3. The computer-implemented method of claim 1, wherein extracting the first set of features from within the image includes applying a Scale-invariant feature transform (SIFT) algorithm to the image.

4. The computer-implemented method of claim 1, wherein determining whether a feature is a blob-like feature or an edge-like feature includes:
   computing a first eigenvalue and a second eigenvalue of the feature;
   computing a ratio of the first eigenvalue to the second eigenvalue; and
   comparing the ratio to a threshold.

5. The computer-implemented method of claim 1, wherein the number of the edge-like features included in the second set of features is a function of a ratio of the number of edge-like features to the number of blob-like features included in the first set of features.

6. The computer-implemented method of claim 5, wherein the function is a piecewise function such that the number of the edge-like features included in the second set of features is zero when the ratio is less than a lower threshold and all the edge-like features of the first set are included in the second set when the ratio is greater than an upper threshold.

7. The computer-implemented method of claim 6, wherein the number of edge-like features included in the second set of features increases linearly when the ratio is between the lower and upper threshold.

8. The computer-implemented method of claim 1, further comprising:
   segmenting the image into a plurality of regions; and
   selecting the features from the first set that are to be included in the second set of features such that the second set of features are distributed among the plurality of regions.

9. The computer-implemented method of claim 1, further comprising:
   capturing the image with a camera; and
   updating a pose of the camera in response to determining that the object of interest is in the image.

10. A device for recognizing an object of interest in an image, the device comprising:
    memory adapted to store program code for recognizing an object of interest in the captured image; and
    at least one processing unit connected to the memory, wherein the program code is configured to cause the at least one processing unit to:
    extract a first set of features from within the image;
    determine whether each feature included in the first set of features is a blob-like feature or an edge-like feature;
    determine a second set of features taken from the first set of features, wherein a number of the edge-like features included in the second set of features is based on a ratio of edge-like features to blob-like features included in the first set of features; and
    determine whether the object of interest is in the image according to the second set of features.

11. The device of claim 10, wherein the instructions to determine whether the object of interest is in the image comprises querying a feature database using the second set of features.

12. The device of claim 10, wherein the instructions to extract the first set of features from within the image includes instructions to apply a Scale-invariant feature transform (SIFT) algorithm to the image.

13. The device of claim 10, wherein the instructions to determine whether a feature is a blob-like feature or an edge-like feature includes instructions to:
- compute a first eigenvalue and a second eigenvalue of the feature;
- compute a ratio of the first eigenvalue to the second eigenvalue; and
- compare the ratio to a threshold.

14. The device of claim 10, wherein the number of the edge-like features included in the second set of features is a function of a ratio of the number of edge-like features to the number of blob-like features included in the first set of features.

15. The device of claim 14, wherein the function is a piecewise function such that the number of the edge-like features included in the second set of features is zero when the ratio is less than a lower threshold and all the edge-like features of the first set are included in the second set when the ratio is greater than an upper threshold.

16. The device of claim 15, wherein the number of edge-like features included in the second set of features increases with increases in the ratio when the ratio is between the lower and upper threshold.

17. The device of claim 10, wherein the program code further comprises instructions to:
- segment the image into a plurality of regions; and
- select the features from the first set that are to be included in the second set of features such that the second set of features are distributed among the plurality of regions.

18. The device of claim 10, wherein the program code further comprises instructions to:
- capture the image with a camera; and
- update a pose of the camera in response to determining that the object of interest is in the image.

19. A non-transitory computer-readable medium including program code stored thereon for recognizing an object of interest in an image, the program code comprising instructions to:
- extract a first set of features from within the image;
- determine whether each feature included in the first set of features is a blob-like feature or an edge-like feature;
- determine a second set of features taken from the first set of features, wherein a number of the edge-like features included in the second set of features is based on a ratio of edge-like features to blob-like features included in the first set of features; and
- determine whether the object of interest is in the image according to the second set of features.

20. The non-transitory computer-readable medium of claim 19, wherein the instructions for determining whether the object of interest is in the image comprises querying a feature database using the second set of features, and wherein the instructions for extracting the first set of features from within the image includes applying a Scale-invariant feature transform (SIFT) algorithm to the image.

21. The non-transitory computer-readable medium of claim 19, wherein the instructions to determine whether a feature is a blob-like feature or an edge-like feature includes instructions to:
- compute a first eigenvalue and a second eigenvalue of the feature;
- compute a ratio of the first eigenvalue to the second eigenvalue; and
- compare the ratio to a threshold.

22. The non-transitory computer-readable medium of claim 19, wherein the number of the edge-like features included in the second set of features is a function of a ratio of the number of edge-like features to the number of blob-like features included in the first set of features.

23. The non-transitory computer-readable medium of claim 22, wherein the function is a piecewise function such that the number of the edge-like features included in the second set of features is zero when the ratio is less than a lower threshold and all the edge-like features of the first set are included in the second set when the ratio is greater than an upper threshold.

24. The non-transitory computer-readable medium of claim 19, further comprising instructions to:
- segment the image into a plurality of regions; and
- select the features from the first set that are to be included in the second set of features such that the second set of features are distributed among the plurality of regions.

25. An apparatus for recognizing an object of interest in an image, the apparatus comprising:
- means for extracting a first set of features from within the image;
- means for determining whether each feature included in the first set of features is a blob-like feature or an edge-like feature;
- means for determining a second set of features taken from the first set of features, wherein a number of the edge-like features included in the second set of features is based on a ratio of edge-like features to blob-like features included in the first set of features; and
- means for determining whether the object of interest is in the image according to the second set of features.

26. The apparatus of claim 25, wherein the means for determining whether the object of interest is in the image comprises querying a feature database using the second set of features, and wherein the means for extracting the first set of features from within the image includes applying a Scale-invariant feature transform (SIFT) algorithm to the image.

27. The apparatus of claim 25, wherein the means for determining whether a feature is a blob-like feature or an edge-like feature includes:
- means for computing a first eigenvalue and a second eigenvalue of the feature;
- means for computing a ratio of the first eigenvalue to the second eigenvalue; and
- means for comparing the ratio to a threshold.

28. The apparatus of claim 25, wherein the function is a piecewise function such that the number of the edge-like features included in the second set of features is zero when the ratio is less than a lower threshold and all the edge-like features of the first set are included in the second set when the ratio is greater than an upper threshold.

29. The apparatus of claim 28, wherein the number of edge-like features included in the second set of features increases linearly when the ratio is between the lower and upper threshold.

30. The apparatus of claim 25, further comprising:
- means for segmenting the image into a plurality of regions; and
- means for selecting the features from the first set that are to be included in the second set of features such that the second set of features are distributed among the plurality of regions.

* * * * *